United States Patent [19]
Yates

[11] Patent Number: 6,077,893
[45] Date of Patent: Jun. 20, 2000

[54] COMPOSITIONS OF POLY(PHENYLENE ETHER) AND POLYESTER RESINS, WHICH EXHIBIT IMPROVED FLOW

[75] Inventor: John B. Yates, Glenmont, N.Y.

[73] Assignee: General Electric Co., Pittsfield, Mass.

[21] Appl. No.: 08/300,902

[22] Filed: Sep. 1, 1994

[51] Int. Cl.$^7$ ....................................................... C08K 5/16
[52] U.S. Cl. ............................................................ 524/198
[58] Field of Search ............................................. 524/195

[56] References Cited

U.S. PATENT DOCUMENTS

| | | |
|---|---|---|
| 4,113,692 | 9/1978 | Wambach . |
| 4,119,607 | 10/1978 | Gergen et al. ............................ 523/522 |
| 4,124,561 | 11/1978 | Phelps et al. . |
| 4,140,669 | 2/1979 | Phelps et al. . |
| 4,185,047 | 1/1980 | Cohen . |
| 4,271,064 | 6/1981 | Dieck . |
| 4,280,949 | 7/1981 | Dieck . |
| 4,290,937 | 9/1981 | Cohen . |
| 4,296,021 | 10/1981 | Wambach . |
| 4,386,027 | 5/1983 | Cohen . |
| 4,401,792 | 8/1983 | Axelrod et al. . |
| 4,436,860 | 3/1984 | Hepp . |
| 4,451,606 | 5/1984 | Campbell . |
| 4,467,057 | 8/1984 | Dieck et al. . |
| 4,532,281 | 7/1985 | Lee, Jr. et al. . |
| 4,532,290 | 7/1985 | Jaquiss et al. . |
| 4,560,722 | 12/1985 | Tyrell . |
| 4,672,086 | 6/1987 | Seiler et al. . |
| 4,786,664 | 11/1988 | Yates . |
| 4,816,510 | 3/1989 | Yates . |
| 4,831,087 | 5/1989 | Brown . |
| 4,866,130 | 9/1989 | Brown et al. . |
| 4,879,346 | 11/1989 | Bopp et al. . |
| 4,927,881 | 5/1990 | Brown . |
| 4,935,472 | 6/1990 | Brown et al. . |
| 4,970,272 | 11/1990 | Gallucci ................................... 525/397 |
| 4,978,715 | 12/1990 | Brown et al. . |
| 4,997,612 | 3/1991 | Gianchandai et al. . |
| 5,079,297 | 1/1992 | Brown et al. . |
| 5,081,184 | 1/1992 | Brown et al. . |
| 5,091,472 | 2/1992 | Brown et al. . |
| 5,115,016 | 5/1992 | Dickens et al. . |
| 5,151,460 | 9/1992 | Yates et al. . |
| 5,162,412 | 11/1992 | Liu . |
| 5,247,006 | 9/1993 | Khouri et al. ........................... 524/508 |
| 5,258,215 | 11/1993 | van Es et al. . |

FOREIGN PATENT DOCUMENTS

| | | |
|---|---|---|
| 0 461 422 | 12/1991 | European Pat. Off. . |
| 0 550 208 | 7/1993 | European Pat. Off. . |
| 5 032 881 | 2/1993 | Japan . |

*Primary Examiner*—Kriellion Sanders

[57] ABSTRACT

Disclosed are poly(phenylene ether) resin—polyester resin compositions comprising a flow promoting amide. The compositions may optionally contain an impact modifier; a non-elastomeric polymer of an alkenylaromatic compound; a polycarbonate resin; a reinforcing filler or any combination of the foregoing. The compatibility of the compositions can be further improved with the addition of a poly(phenylene ether) resin which is epoxy or ortho-ester functionalized. Improved articles can be made from these compositions.

11 Claims, No Drawings

COMPOSITIONS OF POLY(PHENYLENE ETHER) AND POLYESTER RESINS, WHICH EXHIBIT IMPROVED FLOW

BACKGROUND OF THE INVENTION

1. Field of the Invention

This invention relates to poly(phenylene ether)-polyester compositions which exhibit enhanced properties, such as improved flow.

2. Brief Description of the Related Art

Poly(phenylene ether) resins (referred to hereafter as "PPE") are commercially attractive materials because of their unique combination of properties, for example, high strength, dimensional and hydrolytic stability, and dielectric properties. Furthermore, the combination of these resins with polyester resins into compatibilized blends results in additional overall properties such as improved chemical resistance necessary for many automotive applications. Examples of compatibilized PPE-polyester blends can be found in U.S. Pat. Nos. 4,831,087, 4,927,881, 4,978,715, 5,096,979, and 5,212,255, which are all incorporated herein by reference. The properties of these blends can be further enhanced by the addition of various additives such as impact modifiers, flame retardants, light stabilizers, processing stabilizers, heat stabilizers, antioxidants and fillers.

The overall physical properties of compatibilized PPE-polyester blends would make them attractive for a variety of articles in the automotive market except that many of these articles are preferentially produced using conversion techniques such as injection molding. Some of the desirable applications, for example, exterior body panels have very long flow lengths and therefore require resins that have very low viscosities in order to completely fill the molding tools. Compatibilized PPE-polyester blends have inadequate flow properties at the processing temperatures that are needed to minimize the thermal degradation of the resins. Increasing the processing temperature to higher than these temperatures in order to reduce viscosity of the blends results in brittle parts and many surface imperfections in the final part, both of which are unacceptable.

Additives that increase the flow of other resin compositions are generally not useful in compatibilized PPE-polyester compositions as they typically either interfere with the compatibilization chemistry, or they act to improve the flow by lowering the molecular weight of one of the components of the composition, or they result in significant loss in the heat resistance of the composition. All of these results are unsatisfactory as one of the goals of the present invention is to improve the flow while retaining or enhancing the physical properties of the compatibilized PPE-polyester compositions.

It is therefore apparent that a long felt need exists for compatibilized PPE-polyester compositions that have improved flow yet retain the other attractive physical properties.

SUMMARY OF THE INVENTION

The long felt needs discussed above have been generally satisfied by the discovery of an improved thermoplastic composition which comprises:

A) a poly(phenylene ether) resin;
B) a polyester resin; and
C) an amount of at least one amide selected from the group consisting of primary amides, secondary amides and alkylene bisamides to effectively improve the flow of the composition.

The composition may further comprise at least of the following optional components:

D) at least one impact modifier;
E) at least one non-elastomeric polymer of an alkenylaromatic compound;
F) a polycarbonate resin;
G) at least one reinforcing filler; and
H) at least one additive selected from the group consisting of anti-oxidants, flame retardants, drip retardants, dyes, pigments, colorants, fillers, stabilizers, antistatic agents, plasticizers and lubricants.

The description which follows provides further details regarding this invention.

DETAILED DESCRIPTION OF THE INVENTION

The PPE employed in the present invention as Component A are known polymers comprising a plurality of structural units of the formula (I):

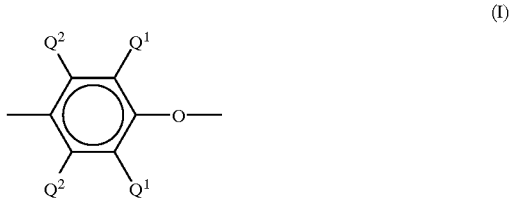

wherein in each structural unit independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two PPE chains to produce a higher molecular weight polymer, provided a substantial proportion of free OH groups remains.

The PPE generally has a number average monocular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

The use of PPE containing substantial amounts of unneutralized amino nitrogen may, under certain conditions, afford compositions with undesirably low impact and/or tensile strengths. The possible reasons for this are explained hereinafter. The amino compounds include, in addition to the aminoalkyl end groups, traces of amine (particularly secondary amine) originating in the catalyst used to form the PPE.

It has further been found that the properties of the compositions can often be improved in several respects, particularly impact strength, by removing or inactivating a substantial proportion of the amino compounds in the PPE. Polymers so treated are sometimes referred to hereinafter as "inactivated PPE". They preferably contain unneutralized amino nitrogen, if any, in amounts no greater than 800 ppm. and more preferably in the range of about 200–800 ppm., as determined by the Kjeldahl method. Various means for inactivation have been developed in any one or more thereof may be used.

A method of inactivation is by extrusion of the PPE under compounding conditions with vacuum venting. This may be achieved either in a preliminary extrusion step (which is sometimes preferred) or during extrusion of the composition of this invention, by connecting a vent of the extruder to a vacuum source capable of reducing the pressure to about 20 torr or less.

It is believed that the inactivation method aids in the removal by evaporation of any traces of free amines (predominantly secondary amines) in the polymer, including thermally labile amines from the PPE during compounding. PPE having a free amine nitrogen content below about 600 ppm. have been found particularly useful in this invention. However, the invention is not dependent on any theory of inactivation.

It is preferable for at least some of the PPE to be a "compatibilizing PPE." Appropriate compatibilizing PPE's are those which affect the compatibility of the PPE with the various components of the blend. Compatibility is meant to include the minimization of gross phase separation between the components of the blend (i.e., the PPE and the polyester). Indicators of improved compatibilization include, for example, increased tensile elongation, reduced delamination tendency, increased ductility and improved phase morphology stabilisation. It is through the effect of improving the compatibilization between the blend components which determines, in part, the desirable physical properties of the blend. Also included in the present invention are compatibilizing agents for improving the compatibility of the PPE with the polyester resins.

For one embodiment of the present invention, it is important for at least some of the PPE to contain at least one type of functional group capable of reacting with a polyester. It is thought that reactions can occur between some of the components of the composition, for example, between the compatibilizing PPE and the polyester resin which results in the formation of PPE-polyester copolymers. The functional groups may be present on a polymer endgroup or along the backbone of the polymer chain. PPE containing the functional groups may be referred to as functionalized PPE.

One type of functionalized PPE capable of reacting with a polyester are those fucntionalized PPE which comprise reactive epoxy groups. Suitable epoxy functional PPE are described in Brown et al, U.S. Pat. Nos. 4,994,531 and 4,994,525, both of which are hereby incorporated by reference. A method for the preparation of the functionalized PPE may comprise reacting a PPE with at least one polymerizable olefinic compound of the following formula (II)

(II)

wherein $R^1$ is hydrogen or alkyl (i.e., alkyl of up to 7 carbon atoms), $R^2$ is hydrogen, or a reactive group containing at least one epoxy, or a substituent substantially inert to an epoxy and Z is a reactive group containing at least one epoxy; and wherein $R^2$ and Z can both contain at least one epoxy, for example, bis-glycidyl maleate.

The $R^1$ substituent of formula (II) is preferably hydrogen or methyl. The epoxy-containing species is preferably glycidyl. Thus, it will be apparent to those skilled in the art that suitable compounds include, for example, glycidyl methacrylate, glycidyl acrylate, glycidyl ethyl maleate, glycidyl ethyl fumarate, allyl glycidyl ether, bis-glycidyl maleate, and bis-glycidyl fumarate.

The reaction may be conducted in solution in a substantially inert diluent such as toluene, xylene, chlorobenzene, o-dichlorobenzene or 1,2,4-trichlorobenzene, followed by isolation of the functionalized PPE by conventional operations such as precipitation by a non-solvent for PPE. It is also possible to conduct the reaction in the melt. Melt reactions are often conveniently carried out in an extruder or similar equipment.

The reaction between the PPE and the olefinic compound is typically conducted at temperatures in the range of about 100°–350° C. The proportions of reagents are subject to wide variation, depending on the degree of functionalization desired and the conditions used. The weight ratio of olefinic compound to PPE is typically in the range of about 0.1% to 4% by weight based on the amount of weight of the PPE for melt reactions. For solution reactions, the weight ratio of olefinic compound to PPE can a much broader, for example, between about 0.1% to about 8.5% by weight or higher, based on the weight of the PPE.

It is sometimes advantageous to use an initiator in the preparation of the functionalized PPE with the olefinic compound. Suitable initiators include free radical initiators such as, for example, various peroxides and hydroperoxides. Specific examples include benzoyl peroxide, dicumyl peroxide, 2,5-dimethyl-2,5-di(t-butylperoxy)hexyne-3 and cumene peroxide, with 2,5,-dimethyl-2,5-di(t-butylperoxy) hexyne-3 being preferred. When it is used, the amount of initiator used can generally vary of from about 0.05 weight percent to about 0.5 weight percent relative to the weight of the PPE.

It is frequently found that some homopolymerization of the olefinic compound occurs simultaneously with functionalization of the PPE. This is especially true with olefinic epoxides. Since the presence of homopolymer is not beneficial for the purposes of the invention, removal thereof is often advisable. It may be achieved by conventional means, typically involving precipitation of a methylene chloride complex of the PPE as described by Factor et al. in J. Polymer Sci. Polymer Letters Ed. 7, 205–209 (1969).

The most preferred epoxy functional PPE is epoxy triazine-capped PPE disclosed in U.S. Pat. No. 5,096,979, which is incorporated herein by reference. This type of capped polymer contains end groups of the formula (III):

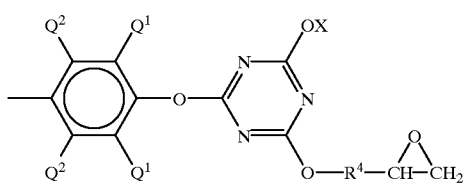

(III)

wherein $Q^1$ and $Q^2$ are as described for Figure I, X is an alkyl, cycloalkyl, aromatic group, or formula (IV):

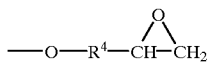

(IV)

and $R^4$ is a divalent aliphatic, alicyclic, heterocyclic, or either substituted or unsubstituted aromatic hydrocarbon group.

The epoxytriazine-capped PPE materials may be prepared in solution by reacting at least one PPE polymer with a compound of the formula (V):

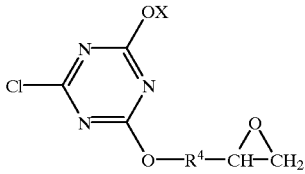

(V)

wherein $R^4$ and X having been defined for Figure III.

The reaction can be carried out in the presence of a basic reagent such a pyridine.

Examples of epoxychlorotriazines suitable for this invention include the following:
  2-chloro-4,6-diglycidoxy-1,3,5-triazine, also known as diglycidyl chlorocyanurate ("DGCC");
  2-chloro-4-(n-butoxy)-6-glycidoxy-1,3,5-triazine, also known as n-butyl glycidyl chlorocyanurate ("BGCC"); and
  2-chloro-4-(2,4,6-trimethylphenoxy)-6-glycidoxy-1,3,5-triazine, also known as mesityl glycidyl chlorocyanurate ("MGCC").

Suitable methods for the preparation of these epoxychlorotriazines are known in the art and described, for example in U.S. Pat. No. 4,895,945, which is incorporated herein by reference. As an illustration, 2,4,6-trichlorotriazine may be reacted with glycidol or combinations of glycidol with n-butanol or mesitol.

Usually, about 1% to about 20% by weight epoxychlorotriazine is used for capping, based on the amount of PPE employed. The basic reagent is present in an amount effective to promote the reaction, usually about 0.5 equivalents per mole to 5 equivalents per mole of chloroepoxytriazine.

As an alternative to the solution method, an interfacial technique may be used to prepare the epoxychlorotriazine-capped PPE polymers, wherein the reaction is carried out in the presence of water, a water-soluble base such as sodium hydroxide, and a phase transfer catalyst such as tetraalkylammonium halide compound. This technique is sometimes preferred because it results in a relatively low level of chemically-bound halide in the product.

The capped PPE polymers may be isolated by conventional techniques, such as precipitation with a non-solvent.

Another useful PPE for the present invention is an orthoester functional PPE. The orthoester functional PPE preferably contain orthoester moieties represented by the formula (VI):

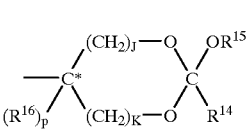

(VI)

wherein:
  $R^{15}$ is a $C_{1-4}$ primary or secondary alkyl radical or is an alkylene radical forming a second 5- or 6-membered ring with C*; and
  $R^{14}$ is a $C_{1-4}$ primary or secondary alkyl or $C_{6-10}$ aromatic radical, or $R^{14}$ and $R^{15}$ together with the atoms connecting them form a 5-, 6- or 7-membered ring; and
  $R^{16}$ is hydrogen or $C_{1-4}$ primary or secondary alkyl; and
  K is 0 or 1; and
  J is 1 or 2; and
  p is 0 when $R^{15}$ and C* form a ring and is otherwise 1.

By the term "orthoester" is meant a compound in which one carbon atom is attached to another by a direct carbon—carbon bond, and to three further carbon atoms through oxygen. Such compounds can be considered to be esters of the hypothetical orthoacids $R—C(OH)_3$, wherein R is an organic radical. The existence of such orthoacids is for the most part unknown, since they immediately dehydrate to conventional carboxylic acids. However, esters of such acids are known and the compositions of this invention include certain polymer substituted esters of this type.

The $R^{15}$ radical may be a $C_{1-4}$ primary or secondary alkyl radical such as methyl, ethyl, n-propyl, isopropyl, n-butyl, isobutyl or secondary butyl. Primary radicals and especially the methyl radical are generally preferred.

It is also possible for $R^{15}$ to form a second 5- or 6-membered ring with other portions of the molecule. For this purpose, one of the carbon atoms in the orthoester ring is designated C* to indicate its role as part of said second ring.

The $R^{14}$ value may be a $C_{1-4}$ primary or secondary alkyl radical as defined above for $R^{15}$ or a $C_{6-10}$ aromatic (preferably aromatic hydrocarbon) radical. Finally, it is possible for $R^{14}$ and $R^{15}$ together to form a 5-, 6- or 7-membered ring with the atoms connecting them. Thus, the invention includes certain spiro orthoester-functionalized PPE.

The $R^{16}$ radical may be hydrogen or an alkyl radical similar to $R^{14}$ and $R^{15}$. It is preferably hydrogen.

The values of J and K depend on whether the cyclic orthoester moiety is a 5-membered or 6-membered ring. In general, 5-membered rings are preferred; that is, K is 0 and J is 1. However, the invention also includes compositions in which a 6-membered ring is present, which requires either that J and K both be 1 or that K be 0 and J be 2.

The value of the subscript p also depends on the cyclic structure of the orthoester moiety. If C* is part of a ring structure with $R^{15}$, all four valences thereof are satisfied and p will be 0. If this is not the case, p will be 1.

The following is an illustrative orthoester moiety (VII) which may be present in an orthoester functional PPE:

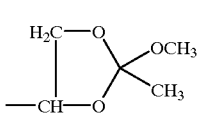

(VII)

and which may also be referred to as a 4-(2-methoxy-2-methyl-1,3-dioxolanyl) radical and is usually preferred. Intermediates for preparation of such compounds include 4-hydroxymethyl-2-methoxy-2-methyl-1,3-dioxolane, which is obtainable by the reaction of glycerol and methyl orthoacetate. An improved method for the preparation of this and structurally related compounds in substantially pure form and the products thus obtained are disclosed in U.S. Pat. No. 5,231,197, which is incorporated herein by reference.

The following illustrative orthoester moiety (VIII) may be present in the orthoester functional PPE:

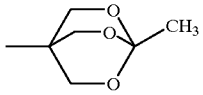

(VIII)

The above moiety may be referred to as a 4-(1-methyl-2,6,7-trioxabicyclo[2.2.2]octyl) radical; the methylol derivative thereof can be prepared by the reaction of ethyl orthoacetate with a substantially equimolar amount of pentaerythritol.

One variety of the orthoester functional PPE is a PPE that is endcapped with an orthoester group of the formula (IX):

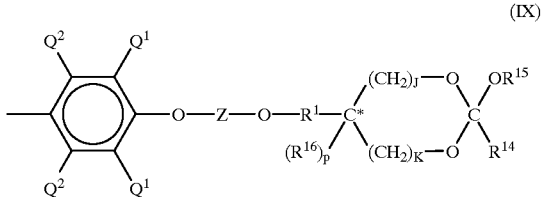

(IX)

wherein:
each $Q^1$ and each $Q^2$ are as defined for Figure I and $R^{14}$, $R^{15}$, $R^{16}$ J, K, p and C* are as previously defined in Figure IV; and the $R^1$ radical may be a $C_{1-6}$ alkylene radical such as methylene, ethylene, propylene, trimethylene, pentamethylene or hexamethylene. It is most often methylene.

The Z radical may be any linking group which is substantially inert under the conditions of the PPE capping reaction. It generally serves principally as a spacer between the othoester moiety and the PPE chain; however, it may contain reactive groups of certain types, including groups displaceable by amine groups as described hereinafter.

Illustrative Z moieties include the following formulae (X):

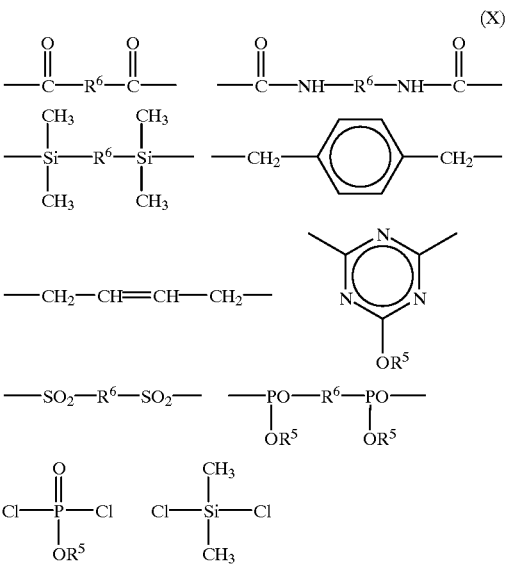

(X)

wherein $R^6$ is a divalent aliphatic, alicyclic or aromatic radical and $R^5$ is an alkyl, cycloalkyl or aromatic radical or a radical of the formula (XI):

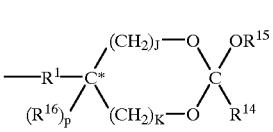

(XI)

wherein the $R^1$, $R^{14}$, $R^{15}$, $R^{16}$, J, K, p and C* are as defined for Figure IX.

An orthoester endcapped PPE may be made by effecting a reaction between PPE and an orthoester of the formula (XII):

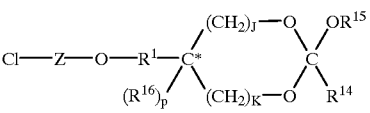

(XII)

wherein the $R^1$, $R^{14}$, $R^{15}$, $R^{16}$, Z, J, K, p and C* are as defined for Figure IX.

The above orthoester compounds (XII) may be prepared by the reaction of a compound of the formula Z—Xq, wherein X is a good leaving group such as halide (especially chloride) and q is 2 or 3, with a hydroxy-substituted orthoester of the formula (XIII):

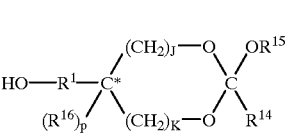

(XIII)

wherein the $R^1$, $R^{14}$, $R^{15}$, $R^{16}$, Z, J, K, p and C* are as previously defined for Figure IX, under conditions readily ascertainable by those skilled in the art. Alternatively, compounds in which Z contains carbamate groups (e.g., has formula:

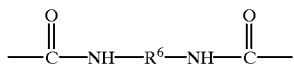

may be prepared by the reaction of a diisocyanate with a substantially equivalent amount of an orthoester compound.

Desireable orthoester compounds for preparing an orthoester endcapped PPE can have the formula (XIV):

(XIV)

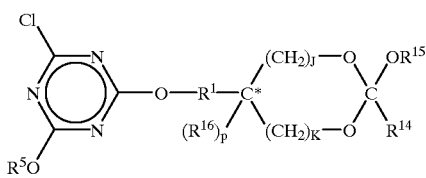

wherein the $R^1$, $R^{14}$, $R^{15}$, $R^{16}$, J, K, p and C* are as previously defined for Figure IX, especially those in which $R^1$ is methylene.

The preferred identity of $R^5$ will depend to some extent on the reactivity desired for the endcapped PPE and the nature of the other polymer with which copolymer formation is desired. Orthoester groups are substantially more reactive with carboxylic acids groups than with amine groups.

The orthoester functional PPE may be prepared by solution-capping of PPE having hydroxy groups with an orthoester functionalized halotriazine. Suitable orthoester functionalized halotriazines include which may be represented by the formula (XV):

(XV)

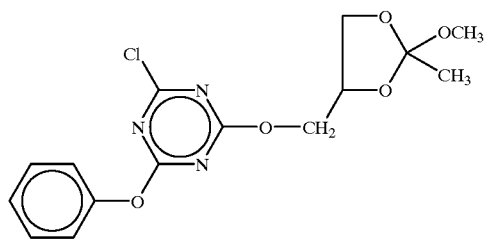

The capping reaction may be performed by dissolving PPE in a solvent such as toluene or chlorobenzene and adding water and a base such as sodium hydroxide in the presence of a phase transfer catalyst, and the halo orthoester compound. The resultant orthoester functional PPE can be isolated as a powder by precipitation from the solvent and filtration.

The PPE having orthoester functional moieties is preferably prepared by melt extrusion of PPE with at least one graftable ethylenically saturated orthoester monomer. The functional orthoester monomer ay be represented by the general formula (XVI):

(XVI)

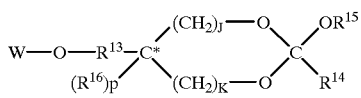

wherein the $R^{14}$, $R^{15}$, $R^{16}$, Z, J, K, p and C* are as previously defined for Figure VI, $R^{13}$ is a $C_{1-6}$ alkylene radical and W is a graftable unsaturated group represented by the following formula (XVII):

(XVII)

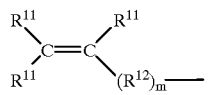

wherein each $R^{11}$ may independently be hydrogen, or a $C_{1-8}$ radical, or substituted derivatives thereof; or an aryl radical, or substituted derivative thereof. Each $R^{11}$ can also be other groups, provided that the group is inert to the orthoester. The value of m may be 1 or greater. $R^{12}$ can be one of the following formulae (XVIII):

(XVIII)

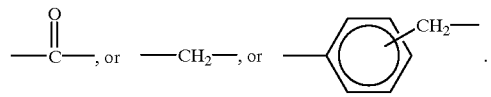

Illustrative examples of monomers which may be employed in the present invention include 4-acryloyloxymethyl-2-methoxy-2-methyl-1,3-dioxolane, 4-methacryloyloxymethyl-2-methoxy-2-methyl-1,3-dioxolane, 4-acryloyloxymethyl-2-methoxy-2-phenyl-1,3-dioxolane and the isomeric mixture of 4-(2-methoxy-2-methyl-1,3-dioxolanyl)methyl vinylbenzyl ethers. Methods for the preparation of these materials and their reaction with PPE can be found in U.S. Pat. Nos. 5,171,866, 5,153,290 and 5,212,255, which are incorporated herein by reference.

Preferably the ethylenically unsaturated functional orthoester monomer is of the formula (XIX):

(XIX)

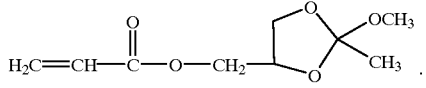

Another preferred ethylenically unsaturated functional orthoester monomer is represented by the formula (XX):

(XX)

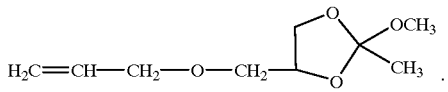

It is sometimes advantageous to use an initiator in the preparation of the functionalized PPE with graftable ethylenically unsaturated orthoester monomer. Suitable initiators include free radical initiators such as, for example, various peroxides and hydroperoxides. Specific examples include benzoyl peroxide, dicumyl peroxide, 2,5-dimethyl-2,5-di(t-butylperoxy)hexyne-3 and cumene peroxide, with 2,5,- dimethyl-2,5-di(t-butylperoxy)hexyne-3 being preferred. When it is used, the amount of initiator used can vary of from about 0.05 weight percent to about 0.5 weight percent relative to the weight of the PPE.

The amount of the above mentioned functionalizing agent that is required to appropriately functionalize the PPE is that which is sufficient to improve the compatibility between the various components in the composition. An effective amount, based on the amount of the PPE, is generally up to about 8% by weight, and is preferably of from about 0.05% to about 4% by weight. In the most preferred embodiments, the amount of the functionalizing agent is in the range of from about 0.1% to about 3% by weight based on the amount of the PPE.

It is also sometimes advantageous to employ at least one lubricant which is substantially inert to the functionalizing agent and other ingredients in the preparation of a functionalized PPE. The presence of the lubricant decreases the required melt processing temperature to produce the functionalized PPE, as well as the compatibilized blends prepared therefrom. As a result, gel formation is minimized.

Suitable lubricants will be apparent to those skilled in the art; in general, they are solids with high lubricity or relatively low melting solids or oils. It is essential that the lubricant not be reactive with the reactive species of the functionalized PPE. The hydrogenated poly($\alpha$-olefins) are often preferred. The most preferred hydrogenated poly($\alpha$-olefins) are those having kinematic viscosities of about 2–20 centistokes and especially 8–12 centistokes at 100° C., as determined by ASTM procedure D445. They are commercially available from such companies as Henkel Corporation as Emery fluids and Gulf Oil Corporation.

The hydrogenated poly($\alpha$-olefins) are generally used in a lubricating amount. The lubricating amount is generally in the range of about 1% to about 5% by weight and preferably about 2% to about 4% by weight; based on the weight of the PPE.

Polyesters suitable for use as Component B of the present compositions include those comprising structural units of the formula (XXI):

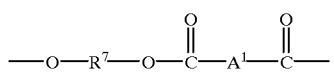

(XXI)

wherein each $R^7$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of formula (XXI) are poly(alkylene dicarboxylates), elastomeric polyesters, liquid crystalline polyesters, polyarylates, and polyester copolymers such as copolyestercarbonates. It is also possible to use a branched polyester in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl endgroups on the polyester, depending on the ultimate end-use of the composition.

In some instances, it is desirable to reduce the number of acid endgroups, typically to less than about 30 micro equivalents per gram, with the use of acid reactive species. In other instances, it is desirable that the polyester has a relatively high carboxylic end group concentration, e.g., about 5–250 micro equivalents per gram or, more preferable, about 20–70 micro equivalents per gram.

The $R^7$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 2 or 4 carbon atoms. The $A^1$ radical in the above formula (XXI) is most often p- or m-phenylene or a mixture thereof. This class of polyester includes the poly(alkylene terephthalates), the poly(alkylene napthalates) and the polyarylates. Such polyesters are known in the art as illustrated by the following U.S. Patents, which are incorporated herein by reference.

| | | | |
|---|---|---|---|
| 2,465,319 | 2,720,502 | 2,727,881 | 2,822,348 |
| 3,047,539 | 3,671,487 | 3,953,394 | 4,128,526 |

The poly(alkylene terephthalates), for example, poly (ethylene terephthalate)(commonly abbreviated as "PET"), poly(cyclohexylene terephthalate)(commonly abbreviated as "PCT"), and poly(butylene terephthalate)(commonly abbreviated as "PBT") are often the preferred polyesters for the present invention, with poly(ethylene terephthalate) (PET) being the most preferred member. Various mixtures of PET, PCT and PBT are also sometimes very suitable.

The polyester may include structural units of the formula (XXII):

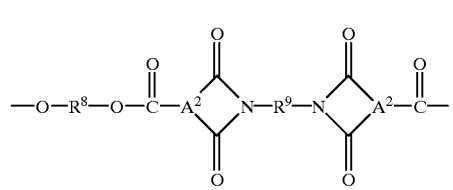

(XXII)

wherein $R^8$ is independently a divalent aliphatic, alicyclic or aromatic hydrocarbon or polyoxyalkylene radical, or mixtures thereof and $R^9$ is a polyoxyalkylene radical and $A^2$ is a trivalent aromatic radical, usually derived from trimellitic acid and has the structure (XXIII):

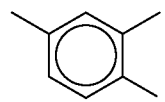

(XXIII)

Such polymers and their mode of preparation are described for example in U.S. Pat. Nos. 4,544,734, 4,556,705, and 4,556,688, which are incorporated herein by reference.

Because of the tendency of polyesters to undergo hydrolytic degradation at the high extrusion and molding temperatures encountered by the compositions of this invention, it is preferred that the polyester be substantially free of water. The polyester may be predried before admixing with the other ingredients. More commonly, the polyester is used without predrying and the volatile materials are removed through the use of vacuum venting the extruder as previously described for the inactivation of the PPE.

The polyesters generally have number average molecular weights in the range of about 20,000–70,000, as determined by intrinsic viscosity (I.V.) at 30° C. in a 60:40 by weight mixture of phenol and 1,1,2,2-tetrachloroethane.

The amide compounds employed as Component C of the present invention are commercially available. The primary amides are usually those based on fatty saturated and unsaturated straight-chain, monobasic acids derived from naturally occurring feedstocks, while the secondary amides are usually products of the reaction of saturated and unsaturated fatty acids with saturated and unsaturated primary amines. The alkylenebisamides (for example, the ethylenebisamides) are usually reaction products of saturated or unsaturated fatty acids and alkylenediamines.

Examples of suitable amides are those selected from the group consisting of stearamide, behenamide, oleyl palmitamide, oleamide, erucamide, stearyl erucamide, erucyl stearamide, N,N'-ethylenebisstearamide, and N,N'-ethylenebisoleamide. The preferred amides are those based on palmitamide or derivatives thereof, such as stearyl palmitamide, erucyl palmitamide, and palmitamide itself. Many of these amides are available from Humko Chemical Co under the trademark KEMAMIDE.

The compositions of the present invention may also contain as component D, at least one impact modifier. The preferred impact modifiers are block (typically diblock, triblock or radial teleblock) copolymers of alkenyl aromatic compounds and dienes. Most often at least one block is derived from styrene and at least one block from at least one of butadiene and isoprene. Especially preferred are the triblock and diblock copolymers comprising polystyrene blocks and diene derived blocks wherein the aliphatic unsaturation has been preferentially removed with hydrogenation. Mixtures of various copolymers are also sometimes useful. The weight average molecular weights of the impact modifiers are typically in the range of about 50,000 to 300,000. Block copolymers of this type are commercially available from Shell Chemical Company under the trademark KRATON, and include, for example, grades D1101, D1102, G1650, G1651, G1652, G1701 and G1702.

The amount of the impact modifier generally present, when one is used, is in the range of about 1% to about 15% by weight based on the total weight of the composition. The preferred range is about 3% to about 10% by weight; based on the total weight of the composition.

The compositions of the present invention may also contain at least one nonelastomeric polymer of an alkenylaromatic compound as component E. Suitable polymers of this type may be prepared by methods known in the art including bulk, suspension and emulsion polymerization. They generally contain at least 25% by weight of structural units derived from an alkenylaromatic monomer of the formula (XXIV):

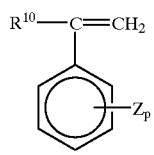

(XXIV)

wherein $R^{10}$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–78% styrene and about 2–32% diene monomer. These rubber modified polystyrenes include high impact polystyrene (commonly referred to as HIPS). Non-elastomeric block copolymer compositions of styrene and butadiene can also be used that have linear block, radial block or tapered block copolymer architectures. They are commercially available from such companies as Fina Oil as under the trademark FINACLEAR and Phillips under the trademark K-RESINS.

The amount of the polymer of a nonelastomeric alkenylaromatic compound, when one is used, is in the range of about 0.01% to about 20% by weight based on the total weight of the composition. The preferred range is about 0.01% to about 15% by weight and the most preferred range is about 0.1% to about 12% by weight; based on the total weight of the composition.

According to the present invention, components A and B may further incorporate component F, a polymer containing a substantial proportion of aromatic polycarbonate units. Amongst the preferred polymers of this type are the polycarbonate resins. The polycarbonate materials comprise structural units of the formula (XXV):

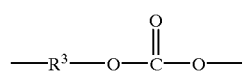

(XXV)

wherein $R^3$ is a divalent organic radical.

Suitable $R^3$ values in formula (XXV) include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^3$ radicals are hydrocarbon radicals although mixtures of various radicals may also be useful.

Preferably, at least about 60% and more preferably at least about 80% of the total number of $R^3$ values in the cyclic oligomer mixtures, and most desirably all of said $R^3$ values, are aromatic. The aromatic $R^3$ radicals preferable have the formula (XXVI):

—A³—Y—A⁴—  (XXVI)

wherein each of $A^3$ and $A^4$ is a monocyclic divalent aromatic radical and Y is a bridging radical in which one or two atoms separate $A^3$ from $A^4$. The free valence bonds in formula (XXVI) are usually in the meta or para positions of $A^3$ and $A^4$ in relation to Y.

In formula (XXVI), the $A^3$ and $A^4$ values may be unsubstituted phenylene or substituted derivatives there of, illustrative substituents (one or more) being alkyl, alkenyl, halo (especially chloro and/or bromo), nitro, alkoxy and the like. Unsubstituted phenylene radicals are preferred. Both $A^3$ and $A^4$ are preferable p-phenylene, although both may be o-phenylene or m-phenylene, or one o-phenylene or m-phenylene and the other p-phenylene.

The bridging radical, Y, is one in which one or two atoms, preferable one, separate $A^3$ from $A^4$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula (XXVI) is the 2,2-bis(4-phenylene) propane radical, which is derived from bisphenol A and in which Y is isopropylidene and $A^3$ and $A^4$ are each p-phenylene.

The weight average molecular weight of the polycarbonate material should be at least about 40,000 (as determined by gel permeation chromatography relative to polystyrene). It is most often in the range of about 40,000–80,000. However, compositions in which component D has a higher molecular weight often have favorable ductility as the expense of decreased flow. The exact molecular weight utilized will depend, in part, on the end-use requirements of the desired application and the degree of molding difficulty encountered in forming the part.

In most instances, component F, the polycarbonate material, consists of a homo-polycarbonate or even a copolycarbonate, such as a copoly(ester carbonate). It is within the scope of the invention, however, to use as component D a blend of a polycarbonate material, or a mixture of polycarbonate materials, with a styrene homopolymer. The polystyrene polymer typically has a number average molecular weight of about 50,000–250,000 and such blends generally contain at least about 50% of the polycarbonate material by weight.

The compositions of the invention also comprise reinforcing fillers as component G. Suitable reinforcing fillers are those which increase the rigidity of the blend. Amongst these, fibrous materials are preferred, in particular glass fibers made from low alkali E-glass, having a fiber diameter of from 8 to 14 μm, the length of the glass fibers in the finished injection molding being from 0.01 mm to 0.5 mm. The glass fibers may be employed as rovings or as chopped or milled glass fibers, and may be provided with a suitable finish and an adhesion promoter or promoter system based on silanes. The amount of the reinforcing filler is generally an amount sufficient to increase the rigidity of the composition. The amount of reinforcing fillers is advantageously from about 5% to about 60% by weight, especially from about 10% to about 40% by weight; all based on the total weight of the composition.

However, other fibrous reinforcing materials, e.g. carbon fibers and micro fibers, potassium titanate single-crystal fibers, gypsum fibers, aluminum oxide fibers or asbestos may also be incorporated. Non-fibrous fillers, e.g. glass beads, hollow glass beads, chalks, micas, talcs, quartzes and natural or calcined kaolins are further preferred fillers, as are combinations of these materials with glass fibers. Like the glass fibers, these latter fillers may be provided with a finish and/or an adhesion promoter or adhesion promoter system.

Compositions of the present invention can also include effective amounts of at least one additive selected from the group consisting of anti-oxidants, flame retardants, drip retardants, dyes, pigments, colorants, fillers, stabilizers, antistatic agents, plasticizers and lubricants as component H. These additives are known in the art, as are their effective levels and methods of incorporation. Effective amounts of the additives vary widely, but they are usually present in an amount up to about 50% or more by weight, based on the weight of the entire composition. Especially preferred additives include hindered phenols, and thio compounds. The preferred amounts of these additives generally ranges up to about 2% total combined weight based on the total weight of the composition.

The preparation of the compositions of the present invention is normally achieved by merely blending the ingredients under conditions for the formation of an intimate blend. Such conditions often include mixing in single or twin screw type extruders or similar mixing devices which can apply a shear to the components. It is often advantageous to apply a vacuum to the melt through a vent port in the extruder to remove volatile impurities in the composition.

All of the ingredients may be added initially to the processing system, or else certain additives may be precompounded with each other or with one of the primary polymer components, compatibilizing PPE and polyester resin. It appears that certain properties, such as impact strength and elongation, are sometimes enhanced by initially precompounding the compatibilizing PPE with the polyester resin prior to compounding with the glass fibers. While separate extruders may be used in the processing, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition, without undue experimentation.

In one of its embodiments, the present invention is directed to a filled composition comprising the following components and any reaction products thereof, all percentage proportions being by weight of total composition:

A) about 15–50% of at least one poly(phenylene ether) resin or optionally, a blend thereof with at least one non-elastomeric polymer of an alkenyl aromatic compound (component E); and B) about 20–80% of at least one polyester resin, the weight ratio of component A to component B being at most about 1.2:1; and C) an effective amount, preferably about 0.05–3%, of at least one flow promoting amide selected from the group consisting of primary amides, secondary amides and alkylene bisamides.

Incorporation of the flow promoting amide has been found to be effective for reducing the viscosity of the composition within the recommended processing temperature range while providing molded parts having excellent surface appearance and important physical property retention, especially impact and heat distortion.

The above compositions may further comprise at least of the following optional materials D to H:

D) up to about 15% by weight and preferably from about 3 to 10% by weight of an elastomeric or rubbery impact modifier, preferably block copolymers derived of alkenyl aromatic compounds and dienes.

For many thermoplastic applications where impact properties are also important, at least one rubbery impact modifier may also be incorporated. These may be utilized in effective amounts, generally up to about 15% by weight based on the total weight of the composition. The preferred compositions will contain from about 3% to about 10% by weight of impact modifier based on the weight of the total composition.

E) Optionally, the compositions may further contain up to about 20% by weight of at least one polymer of a non-elastomeric alkenyl aromatic compound. The alkenyl aromatic compound may additionally contain an elastomeric species such as polybutadiene.

F) Optionally, the compositions may contain up to about 20% by weight of at least one polymer containing a substantial proportion of aromatic polycarbonate units and having a weight average molecular weight of at least about 40,000 as determined by gel permeation chromatography relative to polystyrene or a blend thereof with a styrene homopolymer; and G) optionally up to about 60% by weight of at least one reinforcing filler; and H) optionally, an effective amount, generally up to about 50% by weight, of at least one additive selected from the group consisting of anti-oxidants, flame retardants, drip retardants, dyes, pigments, colorants, fillers, stabilizers, antistatic agents, plasticizers and lubricants.

In a preferred embodiment of the invention, an effective additive package is utilized which provides improved thermal aging resistance and oxidative stability, in addition to other enhancements, to the blends.

An example of an effective amount is about 0.8% by weight of a 1:1 weight ratio of a hindered phenol:thio ester. Optimization of an exact additive package and amount would depend on the particular blend and desired end-use application requirements.

It is thought that certain of the components in these compositions may interact chemically upon blending. Therefore, the invention includes compositions comprising the components recited herein and any reaction products thereof as well as any other optional components.

In various respects, the proportions of ingredients, all based the total weight of the composition, of this invention are an important consideration. As previously mentioned, the proportions of component A is about 15–50% by weight; for component B is about 20–80% by weight; for component C is about 0.05–5% by weight; for optional component D is up to about 15% by weight; for optional component E is up to about 20% by weight; for optional component F is up to about 20% by weight; for optional component G is up to about 60% by weight; and for optional component H is up to about 50% by weight. The preferred ranges, all based the total weight of the composition, are a weight ratio of component A to component B of at most 1.2:1, about 0.1–3% by weight for component C, about 2–10% by weight for component D, up to about 10% by weight for component E, up to about 20% by weight for component F, up to about 35% by weight for component G, and up to about 2% by weight for component H.

It should also be clear that improved molded articles prepared from the compositions of the present invention represent an additional embodiment of this invention.

The following examples are provided to illustrate some embodiments of the present invention. They are not intended to limit the invention in any aspect. All percentages are by weight based on the total weight of the entire composition, unless otherwise indicated.

EXAMPLES

In the following examples illustrating the invention, the blend constituents used were as follows:

PPE-EP: an epoxy functionalized poly(phenylene ether) resin having an intrinsic viscosity in chloroform at 25° C. of about 0.40 dl/gm and obtained from GE Plastics.

PBT: a poly(butylene terephthalate) resin obtained from GE Plastics.

FA: Humko Chemical Co.; KEMAMIDE P-181, oleyl palmitamide.

IM: Fina Oil Co.; FINAPRENE 401, a commercially available radial teleblock copolymer with polystyrene end blocks and a polybutadiene midblock and consisting of about 20% by weight styrene and 80% by weight butadiene.

PS: Phillips Engineering Resins; K-RESIN KR-04, a commercially available nonelastomeric teleblock copolymer of polystyrene endblocks and polybutadiene midblocks and consisting of about 73% styrene and 27% butadiene.

ADDS: a 1:1 mixture of Ciba-Geigy IRGANOX 1010 hindered phenol: Argus SEENOX 412S thio compound.

The compositions of Table 1 were extruded on a Werner-Pfleiderer twin-screw extruder capable of multiple feed and venting locations using a barrel set temperature of about 530° F. and a vacuum of 10–20 inches Hg applied to at least one vent port. All ingredients were fed into the feed throat of the extruder, heated and intimately admixed with a vacuum applied to the melted material. The extrudate was chopped into pellets, dried and molded using a Toshiba injection molding machine using a barrel set temperature of about 520° F. and a mold temperature of about 165° F. Samples of the compositions were also subjected to measurement of notched Izod impact strength according to ASTM D256 (employing a sample size of 2.5 inch by 0.5 inch by 0.125 inch), Dynatup (energy to fracture falling dart test) strength according to ASTM D3763 (using 4 inch diameter by 0.125 inch disks) and heat deflection under a load of 66 psi according to ASTM D648 (employing a sample size of 6 inch by 0.5 inch by 0.25 inch). Flow channel was measured using 10,000 psi of injection pressure under the previously described molding conditions.

The data in Table 1 is illustrative of the surprising improvement in flow and retention of physical properties, especially impact, with the addition of the fatty amide material to the PPE-polyester compositions. Samples 1 and 4 are the respective controls for samples 2 and 3 and sample 5. Detailed analysis of samples 2, 3 and 5 reveals the improvement with flow with the retention of the other physical properties, especially impact strength and ductility.

TABLE 1

| sample | 1 | 2 | 3 | 4 | 5 |
|---|---|---|---|---|---|
| PPE-EP | 20 | 20 | 20 | 30 | 30 |
| PBT | 60 | 60 | 60 | 60 | 60 |
| IM | 10 | 10 | 10 | 10 | 10 |
| PS | 10 | 10 | 10 | 0 | 0 |
| FA | 0 | 0.2 | 0.5 | 0 | 0.5 |
| NI | 14.3 | 14.2 | 14.1 | 16.6 | 16.1 |
| DYN | 39D | 40D | 44D | 39D | 39D |
| FC | 23.0 | 24.5 | 25.5 | 21.5 | 23.5 |
| HDT | 282 | 279 | 271 | 321 | 309 |

NI is notched Izod impact strength in ft-lb/in.
DYN is Dynatup dart impact in in-lbs.; D stands for ductile failure mode.
FC is flow channel in inches;
HDT is heat distortion temperature under 66 psi load presented in ° F.

What is claimed:

1. A composition comprising:

A) a poly(phenylene ether) resin;

B) a polyester resin; and

C) an effective amount of a flow promoting amide selected from the group consisting of primary amides, secondary amides, and alkylene bisamides.

2. The composition of claim 1, further comprising at least one of the components of the group consisting of:
   D) at least one impact modifier;
   E) at least one non-elastomeric polymer of an alkenylaromatic compound;
   F) a polycarbonate resin;
   G) at least one reinforcing filler; and
   H) at least one additive selected from the group consisting of anti-oxidants, flame retardants, drip retardants, dyes, pigments, colorants, fillers, stabilizers, antistatic agents, plasticizers and lubricants.

3. The composition of claim 2, wherein
   component A is present from about 15–50% by weight or as a blend thereof with component E;
   component B is present from about 20–80% by weight, the weight ratio of the poly(phenylene ether) resin to the polyester resin being at most about 1.2:1;
   component C is present from about 0.05–3% by weight;
   component D is present up to about 15% by weight;
   component E is present up to about 15% by weight;
   component F is present up to about 20% by weight;
   component G is present up to about 60% by weight; and
   component H is present up to about 50% by weight;
   wherein all percentages by weight are based on the total weight of the composition.

4. The composition of claim 1, wherein component A contains at least one type of functional group capable of reacting to a polyester.

5. The composition of claim 4, wherein component A is an epoxy or an ortho ester functionalized poly(phenylene ether) resin.

6. The composition of claim 1, wherein the amide is selected from the group consisting of stearamide, behenamide, oleyl palmitamide, oleamide, erucamide, stearyl erucamide, erucyl stearamide, N,N'-ethylenebisstearamide, and N,N'-ethylenebisoleamide.

7. The composition of claim 2, wherein component F has a weight average molecular weight of at least about 40,000 as determined by gel permeation chromatography relative to polystyrene.

8. The composition of claim 2, wherein the impact modifier is a block copolymer derived from alkenyl aromatic compounds and dienes.

9. A composition consisting essentially of:
   A) a poly(phenylene ether) resin;
   B) a polyester resin; and
   C) an effective amount of at least one flow promoting amide.

10. The composition of claim 9, further comprising at least one member of the group consisting of impact modifiers, non-elastomeric polymers of an alkenylaromatic compound, polycarbonate resins and reinforcing fillers.

11. An article made from the composition of claim 1.

* * * * *